United States Patent
Lin et al.

(10) Patent No.: US 7,039,508 B2
(45) Date of Patent: May 2, 2006

(54) TIRE MONITORING SYSTEM WITH A WIRELESS SETTING CAPABILITY

(75) Inventors: Sheng-Hsiang Lin, Kaohsiung (TW); Chang-Hung Lai, Kaohsiung Hsien (TW)

(73) Assignee: Lite-On Automotive Corp., Kaohsiung (TW)

(*) Notice: Subject to any disclaimer, the term of this patent is extended or adjusted under 35 U.S.C. 154(b) by 0 days.

(21) Appl. No.: 10/778,183

(22) Filed: Feb. 17, 2004

(65) Prior Publication Data

US 2005/0071057 A1 Mar. 31, 2005

(30) Foreign Application Priority Data

Sep. 26, 2003 (TW) .............................. 92126594 A

(51) Int. Cl.
*G01M 17/00* (2006.01)
*G06F 19/00* (2006.01)
*B60C 23/02* (2006.01)

(52) U.S. Cl. ..................... 701/29; 701/32; 701/33; 701/45; 340/447; 340/442; 73/146.5

(58) Field of Classification Search ............. 701/29, 701/32, 33, 45; 340/447, 442; 73/146.5
See application file for complete search history.

(56) References Cited

U.S. PATENT DOCUMENTS

| | | | | |
|---|---|---|---|---|
| 5,880,363 | A * | 3/1999 | Meyer et al. | 73/146.5 |
| 6,681,164 | B1 * | 1/2004 | Bergerhoff et al. | 701/36 |
| 2002/0014115 | A1 * | 2/2002 | Young et al. | 73/146 |
| 2003/0093198 | A1 * | 5/2003 | Bergerhoff et al. | 701/29 |
| 2004/0095231 | A1 * | 5/2004 | Ichinose | 340/442 |
| 2004/0138793 | A1 * | 7/2004 | Taguchi et al. | 701/29 |
| 2004/0140887 | A1 * | 7/2004 | Klamer | 340/442 |
| 2004/0149025 | A1 * | 8/2004 | Toyofuku | 73/146 |
| 2004/0155764 | A1 * | 8/2004 | Ichinose | 340/447 |

* cited by examiner

*Primary Examiner*—Thomas G. Black
*Assistant Examiner*—Brian J. Broadhead
(74) *Attorney, Agent, or Firm*—Dennison, Schultz, Dougherty & MacDonald

(57) ABSTRACT

A tire monitoring system with a wireless setting capability includes a wireless controller and a plurality of tire status sensors each tire status sensor is composed a sensing and processing unit having an unique tire serial number, a second low frequency transceiver and an RE transmitter. The wireless controller has a first low frequency transceiver and stores a plurality of tire serial numbers representing different wheel positions. The wireless controller outputs a control signal including a reset command and a new tire serial number to a specific tire status sensor. The sensing and processing unit will be reset and replace the tire serial number when the tire status sensor receives the control signal.

16 Claims, 6 Drawing Sheets

TIRE MONITORING SYSTEM WITH A WIRELESS SETTING CAPABILITY

BACKGROUND OF THE INVENTION

1. Field of the Invention

The present invention relates to a tire monitoring system, and more particularly to a tire monitoring system with a wireless setting capability that wirelessly controls tire status sensors in wheels to set and reset new serial numbers.

2. Description of Related Art

A tire monitoring system basically has a main controller and multiple tire pressure sensors each of which is mounted respectively in wheels. The tire pressure sensor detects the tire pressure and transforms the detected pressure to an RF signal. Each tire pressure sensor has a unique tire serial number so the main controller can identify to which tire the RF signal corresponds and to which tire to respond when the RF signals from different tire status sensors are sent to the main controller. The main controller can display the pressure on a display panel to a driver. The driver can check the display panel and know each wheel's status.

Generally, front wheels and rear wheels of a four-wheel-vehicle are rotated every twenty thousand kilometers. Each new wheel has a tire pressure sensor, each tire pressure sensor has a unique tire serial number, and the serial number represents the wheel position. When the wheels are rotated, the main controller will display the tire pressures in an incorrect wheel pattern on the panel because the main controller identifies the tire pressure by the tire serial number. Under these conditions, the tire pressure sensors must be rotated back to their original-positions. Therefore, rotating wheels is more complex.

To overcome the shortcomings, the present invention provides a tire monitoring system with a wireless setting capability to mitigate or obviate the aforementioned problems.

SUMMARY OF THE INVENTION

The main objective of the present invention is to provide a tire monitoring system that has a wireless reset capability to simplify a reset procedure for tire status sensors. The tire monitoring system basically includes a wireless controller and a plurality of tire status sensors, each of which is mounted in a corresponding wheel. The wireless controller resets the tire status sensors to keep from having to replace the tire status sensors in their original positions.

Another objective of the present invention is to integrate the wireless controller directly with a main controller.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
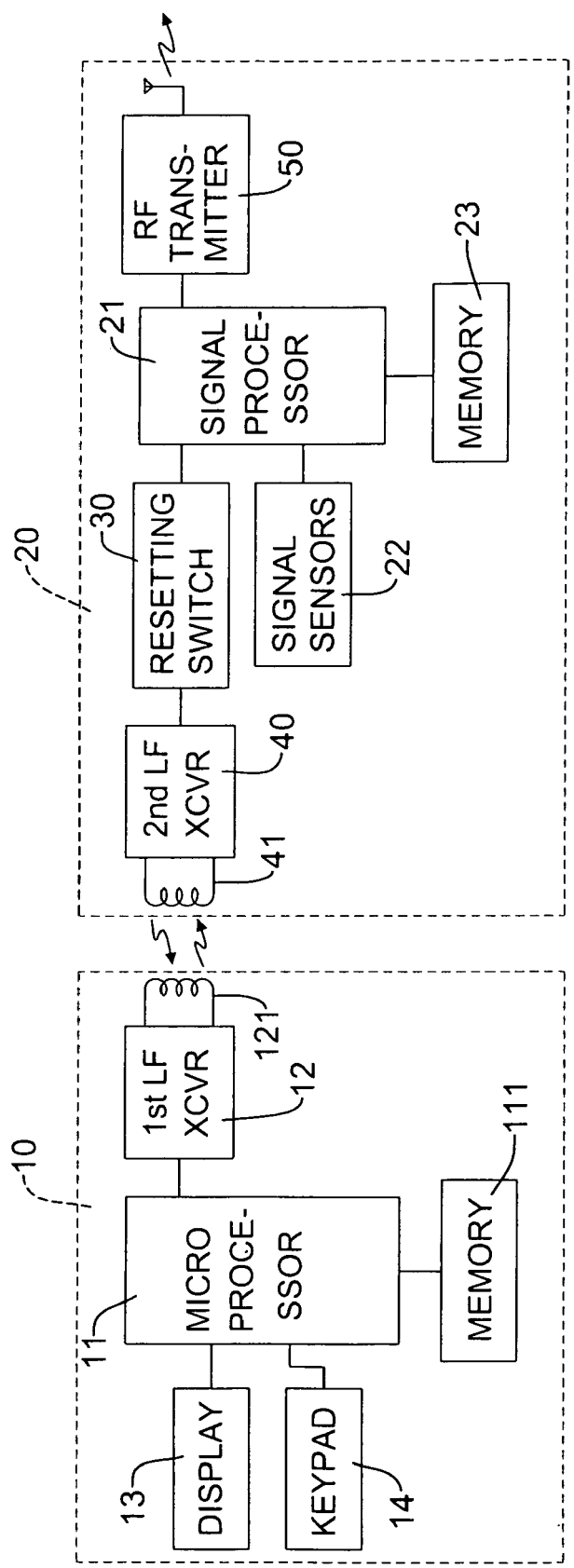
FIG. 1 is a functional block diagram of a first embodiment of a tire monitoring system in accordance with the present invention with only one tire status sensor shown.
Figure 3:
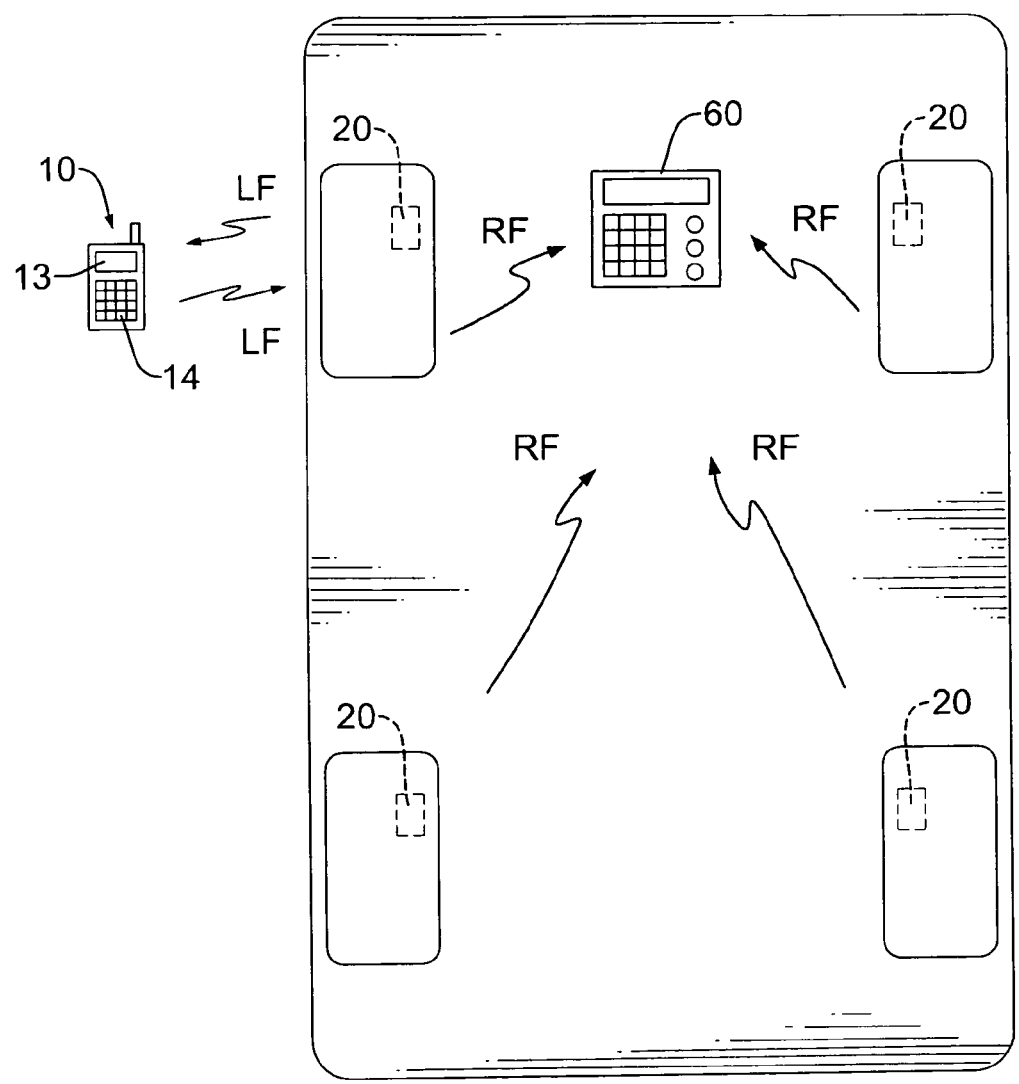
FIG. 3 is a layout diagram of the tire monitoring system in FIG. 1 in a vehicle.

With reference to FIG. 1, a first embodiment of a tire monitoring system in accordance with the present invention includes a wireless controller (10) and a plurality of tire status sensors (20). With further reference to FIG. 3, each tire status sensor (20) is mounted in a corresponding wheel (not numbered) of a vehicle (not numbered) and detects a plurality of tire parameters inside the tire. The tire status sensor (20) formats the tire parameters into a detected data stream and sends the detected date stream to a main controller (60) in the vehicle. The tire status parameters include tire pressure, tire temperature, tire air leakage, etc.

The wireless controller (10) includes a microprocessor (11), a first low frequency (LF) transceiver (XCVR) (12), a display (13) and a keypad (14).

The microprocessor (11) stores a plurality of tire serial numbers, which correspond to different wheel positions. The microprocessor (11) outputs a plurality of control signals in sequence for the tire status sensors (20). Each control signal includes a reset command and a new tire serial number. The microprocessor (11) is further connected to a memory device (111) to store a plurality of tire serial numbers.

The first low frequency transceiver (12) is connected to the microprocessor (11) to convert the control signal to a low frequency signal. In the first embodiment, the first low frequency transceiver (12) has a low frequency antenna (121) and the low frequency signals are output at different times.

The display (13) is connected to the microprocessor (11) to display information about the current control signal that is output from the microprocessor (11). The keypad (14) is connected to the microprocessor (11) to select a specific tire status sensor (20) that the microprocessor (11) resets.

Figure 2:
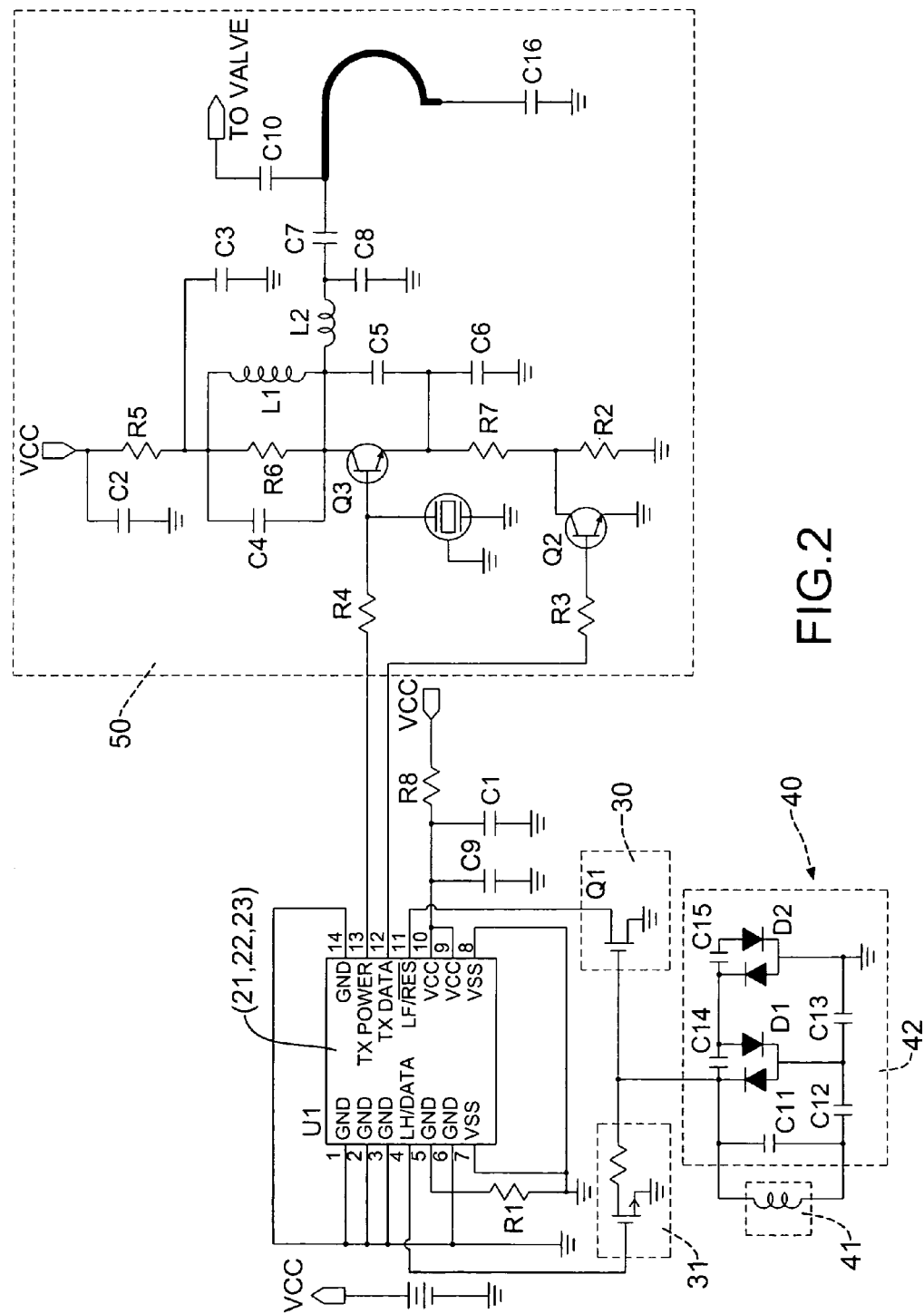
FIG. 2 is a circuit diagram of a tire status sensor in FIG. 1.

With reference to FIG. 2, each tire status sensor (20) includes a sensing and processing unit (not numbered), a second low frequency transceiver (40) and an RF transmitter (50). The sensing and processing unit has a reset port and a data port and is composed of a signal processor (21), a plurality of signal sensors (22) and a memory (23). The memory (23) stores a unique tire serial number. The plurality of signal sensors (22) include a tire pressure sensor, a temperature sensor and a voltmeter.

The signal processor (21), the plurality of signal sensors (22) and the memory (23) are integrated and are implemented in an application specific integrated circuit (ASIC) (U1). The data port (DATA) is connected to a data switch (31). The data switch (31) can be implemented with an FET transistor (not numbered) having a gate terminal (not numbered) connected to the data port (DATA), a drain terminal (not numbered) connected to ground (not numbered) and a source terminal (not numbered). The reset port (RES) is connected to a reset switch (30). The reset switch (30) can be an FET transistor (not numbered) having a drain terminal (not numbered), a source terminal (not numbered) and a gate terminal (not numbered). The drain terminal is connected to ground (not numbered), and the source terminal is connected to the reset port (RES).

The second low frequency transceiver (40) includes a low frequency antenna (41) and a signal amplifier (42). The signal amplifier (42) can be a voltage multiplier connected to the low frequency antenna (41). The gate terminal of the reset switch (30) and the source terminal of the data switch (31) are connected to the signal amplifier (42).

Figure 6:
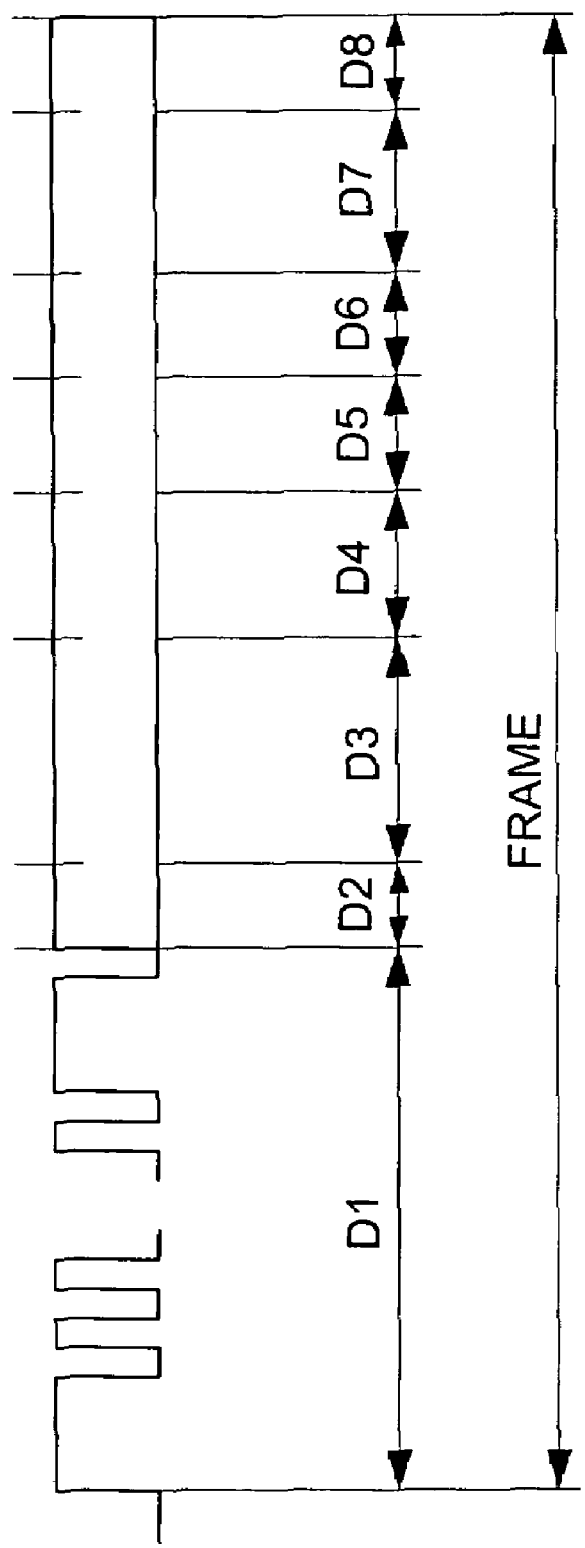
FIG. 6 is a data stream format transmitted by the tire status sensor in FIG. 2.

With additional reference to FIG. 6, the RF transmitter (50) is connected to the sensing and processing unit to convert the detected data stream to an RF signal received by the main controller (60).

With reference FIGS. 1 and 3, the wireless controller (10) needs to be close to the wheel because of the low frequency signal. When the wireless controller (10) outputs the first control signal to the tire status sensor (20) in a front left wheel, the tire status sensor (20) receives the control signal through the second low frequency transceiver (40). When the second low frequency transceiver (40) receives the control signal through the low frequency antenna (41), the signal amplifier (42) amplifies the control signal. The reset switch (30) will be turn on to short the reset port (RES) to ground and reset the sensing and processing unit. After the reset procedure, the sensing and processing unit will continue receiving the new tire serial number in the control signal until the reset switch (30) operates. Therefore, the sensing and processing unit can change the unique tire serial number to a new tire serial number. After the sensing and processing unit obtains an entire new tire serial number, the sensing and processing unit will output confirming data from the data port (DATA). The data port (DATA) controls the data switch operation so the confirming data will be sent back to the wireless controller (10) through the second low frequency transceiver (40). When the wireless controller (10) receives the confirming data, the wireless controller (10) is ready to output the second control signal to the next tire status sensor to replace a new tire serial number. For a fourwheel vehicle, one tire status sensor is in each wheel so the wireless controller (10) has to repeat the above procedure four times to change the tire status sensor's tire serial numbers.

With reference to FIG. 6, the detected data stream output by each tire status sensor (20) includes sequentially a start code (D1), a function code (D2), a tire serial number code (D3), a tire pressure code (D4), temperature code (D5), battery voltage code (D6), accelerometer code (D7) and check sum code (D8). Each tire status sensor has a unique tire serial number in the detected data stream, so the main controller (60) can display the tire status parameters for corresponding wheels in the correct pattern on a display panel of the main controller. How the main controller (60) receives the detected data from the tire status sensors is well known so the detailed operation of the main controller (60) is neither provided nor claimed.

Figure 4:
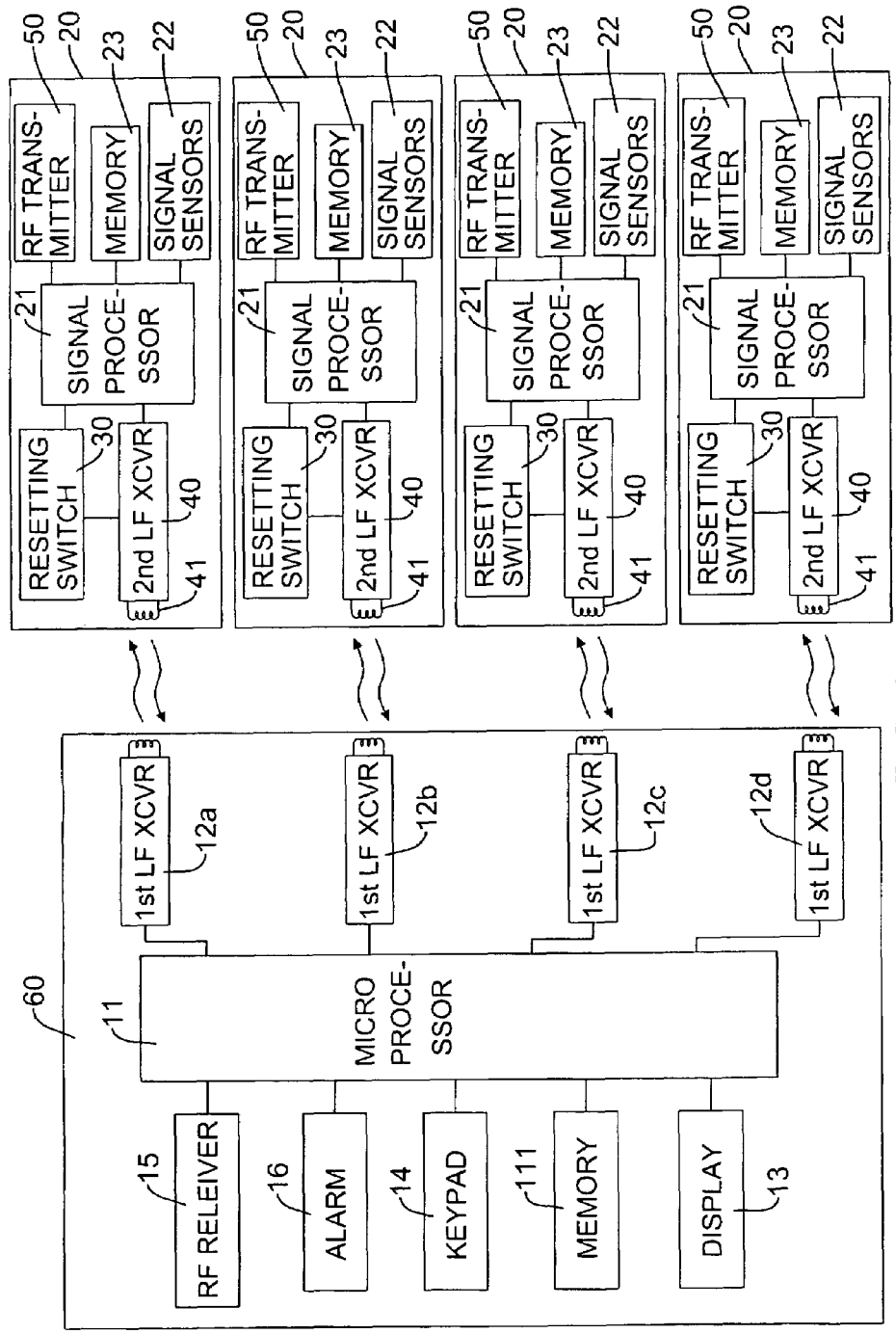
FIG. 4 is a functional block diagram of a second embodiment of a tire monitoring system in accordance with the present invention.
Figure 5:
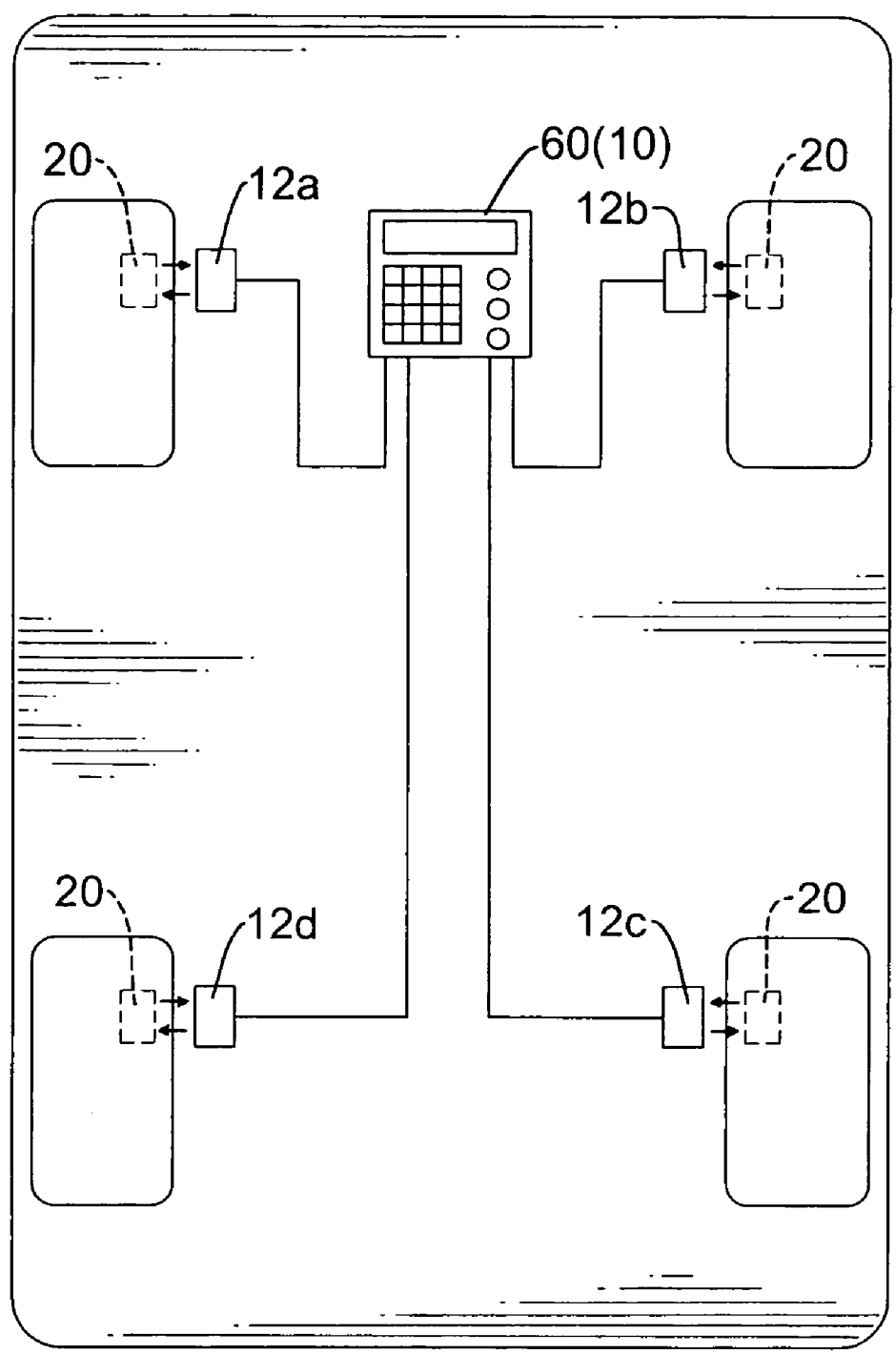
FIG. 5 is a layout diagram of the tire monitoring system in FIG. 4 in a vehicle.

With reference to FIGS. 4 and 5, a second embodiment of a tire monitoring system in accordance with the present invention is functionally the same as the first embodiment except the second embodiment is fully integrated with the main controller (60) in the vehicle. Since the wireless controller (10) is a microprocessor circuit, the wireless controller (10) can be integrated with the main controller (60). That is, the wireless controller (10) includes a microprocessor (11) with an external memory (111), a plurality of first low frequency transceivers (12a to 12d), an RF receiver (15), a display (13), a keypad (14) and an alarm (16).

The external memory (111) also stores a plurality of tire serial numbers corresponding to different wheel positions. Because the main controller (60) is mounted in the vehicle, the plurality of first low frequency transceivers (12a to 12d) will be close to the respective wheels. The RF receiver (15) receives the detected data stream from the tire status sensors (20).

Based on the forgoing description, the monitoring system can wirelessly reset the tire status sensors so that the main controller will display the detected value at the correct positions of the wheels. After rotating the front and rear wheels, a person uses the wireless controller or main controller to reset the new tire serial numbers in the tire status sensors. Thus, the procedure of rotating the tires is simplified.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tire monitoring system with a wireless setting capability, comprising:
    a wireless controller having a microprocessor and one first low frequency transceiver, wherein the microprocessor stores a plurality of tire serial numbers that represent different wheel positions and is connected to the first low frequency transceiver to output a plurality of control signals, each control signal includes a reset command and a new tire serial number; and
    a plurality of tire status sensors, each tire status sensors comprises a sensing and processing unit storing a tire serial number and having a reset and a data port, a second low frequency transceiver connected to the reset and the data port of the sensing and processing unit, and an RF transmitter connected to the sensing and processing unit,
    whereby a specific tire status sensor receives the control signals from the wireless controller through the second low frequency transceiver, and the sensing and processing unit is reset and replaces the tire serial number.

2. The tire monitoring system as claimed in claim 1, wherein the wireless controller further comprises:
    a plurality of first low frequency transceivers each the first low frequency transceiver is connected to the microprocessor wherein the first low frequency transceivers are close to the respective tire status sensors in the wheels;
    an RF receiver connected to the microprocessor to receive RF signals from the RF transmitters of the tire status sensors; and
    an alarm connected to the microprocessor, wherein the alarm is controlled by the microprocessor.

3. The tire monitoring system as claimed in claim 2, wherein the wireless controller further comprises:
    a display connected to the microprocessor to display a current control signal, which is output from the microprocessor; and
    a keypad connected to the microprocessor to select a specific tire status sensor that the microprocessor resets.

4. The tire monitoring system as claimed in claim 2, wherein the sensing and processing unit comprises:
    a signal processor;
    a plurality of signal sensors connected to the signal processor to detect status parameters inside the wheels and respectively output a detected signal to the signal processor; and
    an external memory connected to the signal processor to store the tire serial number.

5. The tire monitoring system as claimed in claim 4, wherein the plurality of signal sensors include a tire pressure sensor, a temperature sensor and a voltmeter.

6. The tire monitoring system as claimed in claim 4, wherein the sensing and processing unit is made of an application specific integrated circuit (ASIC).

7. The tire monitoring system as claimed in claim 1, wherein the wireless controller further comprises:
- a display connected to the microprocessor to display a current control signal, which is output from the microprocessor; and
- a keypad connected to the microprocessor to select a specific tire status sensor that the microprocessor resets.

8. The tire monitoring system as claimed in claim 7, wherein the sensing and processing unit comprises:
- a signal processor;
- a plurality of signal sensors connected to the signal processor to detect status parameters inside the wheels and respectively output a detected signal to the signal processor; and
- an external memory connected to the signal processor to store the tire serial number.

9. The tire monitoring system as claimed in claim 8, wherein the sensing and processing unit is made of an application specific integrated circuit (ASIC).

10. The tire monitoring system as claimed in claim 8, wherein the plurality of signal sensors include a tire pressure sensor, a temperature sensor and a voltmeter.

11. The tire monitoring system as claimed in claim 1, wherein the sensing and processing unit comprises:
- a signal processor;
- a plurality of signal sensors connected to the signal processor to detect status parameters inside the wheels and respectively output a detected signal to the signal processor; and an external memory connected to the signal processor to store the tire serial number.

12. The tire monitoring system as claimed in claim 11, wherein the sensing and processing unit is made of an application specific integrated circuit (ASIC).

13. The tire monitoring system as claimed in claim 11, wherein the plurality of signal sensors include a tire pressure sensor, a temperature sensor and a voltmeter.

14. The tire monitoring system as claimed in claim 1, wherein each tire status sensor further comprises:
- a reset switch connected between the reset port of the sensing and processing unit and the second low frequency transceiver; and
- a data switch connected between the data port of the sensing and processing unit and the second low frequency transceiver.

15. The tire monitoring system as claimed in claim 14, wherein each second low frequency transceiver comprising
- a low frequency antenna; and
- a signal amplifier connected to the low frequency antenna and the reset and data switches.

16. The tire monitoring system as claimed in claim 14, wherein the reset and data switches are FET transistors.

* * * * *